Feb. 1, 1966 W. W. CHOU 3,233,121

LOW NOISE SWITCHING CIRCUITS

Filed June 1, 1962

3 Sheets-Sheet 1

INVENTOR.
WAYNE W. CHOU

BY

ATTORNEY

INVENTOR.
WAYNE W. CHOU

BY

Robert [signature]
ATTORNEY

INVENTOR.
WAYNE W. CHOU
BY
Robert Emmet Morton
ATTORNEY

United States Patent Office 3,233,121

Patented Feb. 1, 1966

3,233,121

LOW NOISE SWITCHING CIRCUITS

Wayne W. Chou, Stamford, Conn., assignor to Barnes Engineering Company, Stamford, Conn., a corporation of Delaware Filed June 1, 1962, Ser. No. 199,290
8 Claims. (Cl. 307—88.5)

This invention relates to improved switching of low level signals.

When low level signals have to be switched a serious problem arises. There is no known switch which does not generate noise when it is opened and closed and this can result in an amount of noise greater than the signals which it is desired to sample.

The problem is particularly acute in a sampling of multiple radiation detectors, for example multiple infrared detectors. The present invention is essentially an electronic or circuit invention and will function with low level devices regardless of how their output is produced. Because of the practical importance in radiation detector work, such as infrared work, the invention will be described in connection with the solution of this problem although it should be understood that this is merely one illustration of the applicability of the invention and is not intended to limit it.

When an array of infrared detectors are to be sampled sequentially problems arise. Such sequential sampling is often of great practical importance as it makes possible a great increase in speed and sensitivity for many uses such as an infrared camera and the like where ordinarily a scene is scanned using a single detector. If it is possible to view simultaneously a large array of detectors, for example a mosaic of 100 or 1,000 detectors, a great increase in speed is possible because most radiation detectors have a substantial time constant.

If each detector is provided with a separate preamplifier and the outputs of these amplifiers are switched for sequential sampling no problem arises as far as noise is concerned because with a sufficiently low noise preamplifier a very low signal can be amplified to the point where it is far above switching noise level. This solution while simple and actually used becomes impractical when a large number of detectors are involved, for example a mosaic of 100 detectors would require 100 preamplifiers and this soon becomes prohibitive from the standpoints of cost, reliability, weight, power consumption and other factors. If an array is to be used practically it is necessary to utilize a much smaller number of amplifiers and to switch sequentially the input of these amplifiers to different detectors. However, when this arrangement is used another problem arises which up to now has been insoluble and so has seriously reduced the possibilities of multiple detector operation. The problem is that there is no known switching means which is low noise and since the input of the amplifier switched must be connected to a detector which may have an extremely small output, the noise may be many times the output and so completely prevents transmission of any intelligible signal. This problem is completely solved by the present invention which, as far as transmission of the desired signal is concerned, takes place with zero noise in the connection between detector and input of the amplifier switched. It is thus possible to utilize systems which are limited either by the amplifier input noise, which can be made very low, or by the inherent noise of the detector.

Essentially the present invention connects sequentially each detector to its amplifier input during a time longer than the sampling rate time and interval. For practical operation this period may be approximately three times as long as the sampling rate interval. The output of the preamplifier switched in is, however, switched to a second or operational amplifier during a time interval corresponding to the switching rate and this switching takes place in the middle third of the longer interval during which the input of the preamplifier is connected to a particular detector. When the preamplifier input is first switched to a particular detector the typical high switching noise occurs. However, at this point the preamplifier output is not connected to the rest of the system and the noise does not come through. The noise dies down quickly, normally in much less than a third of the sampling rate interval, and when the switching noise has died down there is a substantially noise free connection from the detector to the preamplifier input. Now the preamplifier output is switched to the system operational amplifier or to one of them if the system requires more than one. This switch also produces noise but the preamplifier has amplified the weak signal of the detector so greatly that it is above noise level and therefore an intelligible signal is passed through substantially unaffected by the noise. In the final third of the interval during which the preamplifier input is being switched to a detector the connection is broken. This again generates noise but now the output of the preamplifier is no longer connected to the input of the system operational amplifier and so this noise also does not pass on to the system and so in no way degrades the signal.

The sequence is repeated with each detector and sequential sampling is thus effected at all times through substantially noise free connection of the respective detector to the input of its preamplifier. It should be realized that when we refer to a noise free connection we are talking in practical terms. Any connection even a solid wire of low resistance generates some noise when current flows through it, the so-called Johnson noise. This, however, is so many orders of magnitude lower than the switching noise and even lower than the Johnson noise of the detector itself or the noise of even the most quiet preamplifiers that for practical purposes the connection can be considered noise free.

The invention will be described in connection with two types of switching mechanisms which are illustrative only. However, for the sake of clarity the switching of four preamplifiers among 16 detectors will be described. The operation is no different with 100 or 1,000 detectors and in practice the number of preamplifiers used will be a smaller fraction of the number of detectors. The ratio will normally be 10 or considerably more to 1 instead of 4 to 1. However, the more modest numbers permit clearer illustration and the invention will be so illustrated although, of course, the advantages obtained with a 4 to 1 reduction of amplifiers are not as great as when the reduction is much larger. The invention will also be described in connection with the drawings in which:

Figure 1:
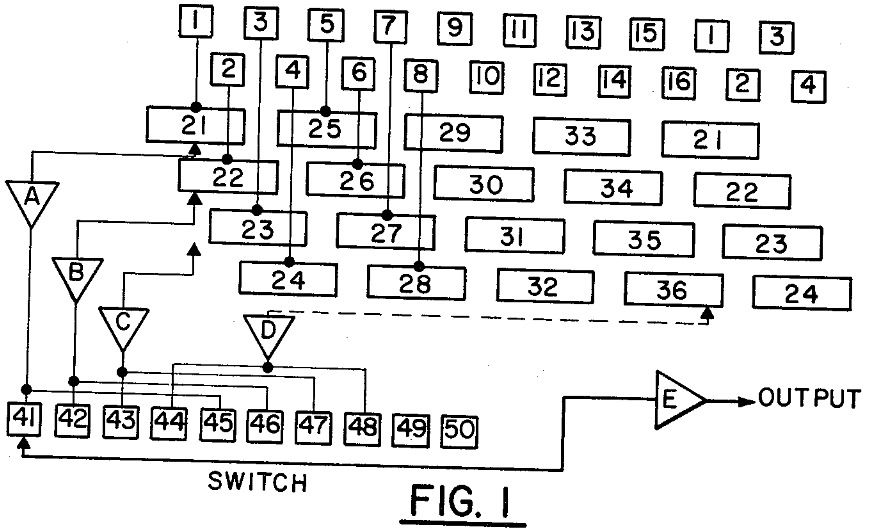
FIG. 1 is a block diagram showing switching sequence.
Figure 2:
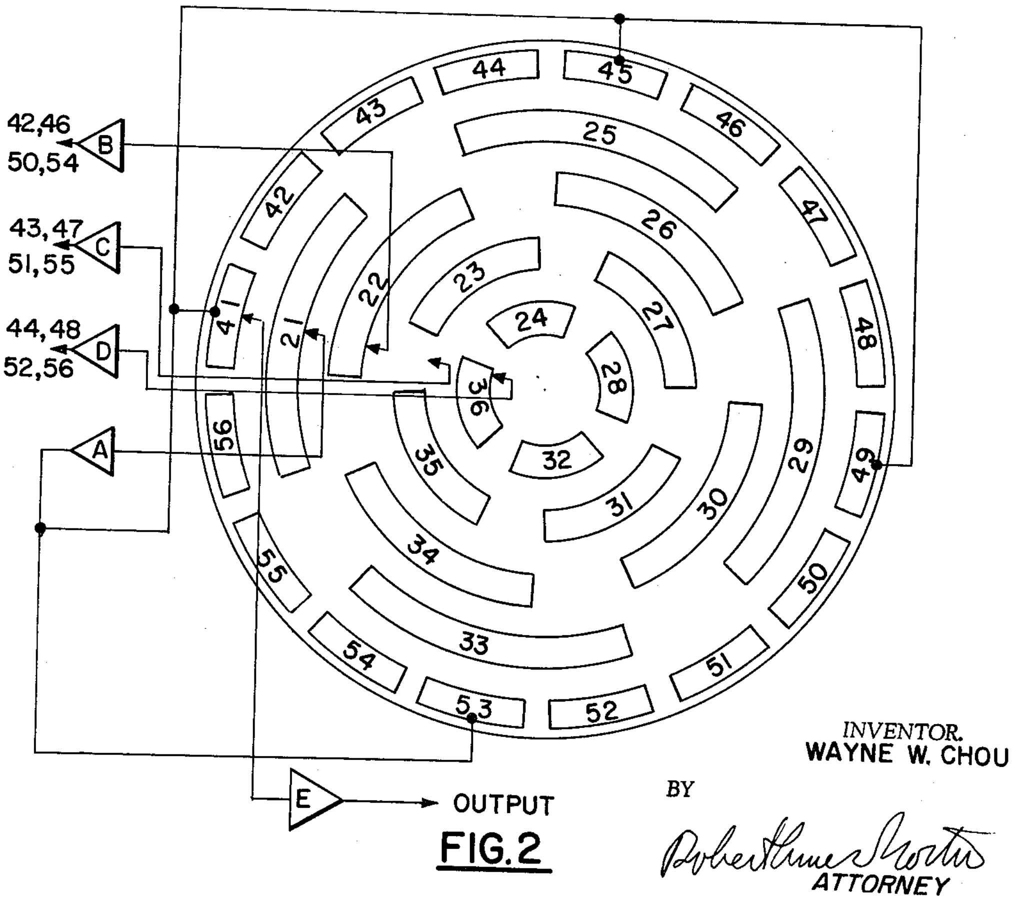
FIG. 2 is a plan view of a mechanical switch with the electronic systems in diagrammatic form.

Turning to FIG. 1 sixteen detectors are shown as numbered squares. Because of overlapping of the switching the first four are repeated. Four preamplifiers are shown designated A, B, C and D and the system operational amplifier E. Switching contacts, each three times the length of the switching time interval, are shown numbered 21 to 36. Finally switch contacts for the outputs of the amplifiers A to D and the input of amplifier E are shown labelled 41 to 56. In FIG. 2 the contacts 21 to 36 and 41 to 56 are set out in full. In FIG. 1 only the first ten of the switch contacts 41 to 50 for the input of the amplifier E are shown in order not to crowd the drawing.

In FIG. 2 the outputs of each preamplifier A to D are connected to four of the contacts 41 to 56. Amplifier A is connected 41, 45, 49 and 53, amplifier B to 42, 46, 50 and 54, etc. In FIG. 2 the actual wire connections are shown only for amplifier A. The outputs for amplifiers B, C and D are shown as arrows to the four numbered contacts. The contacts 21 to 36 are shown in FIG. 2 in four staggered, concentric rings.

To start the sampling sequence let us consider the input of the preamplifier A at the point where the signal from detector 16 is being connected to the amplifier E. This situation is shown in dotted lines on FIG. 1 and it will be seen that amplifier A has just had its input switched to contact 21. At this point, however, the output of amplifier A is not connected to the input of amplifier E and so the noise generated by the switching does not pass on to the system.

FIGS. 1 and 2 show the situation at the next sampling. It will be seen now that in this position the input of amplifier A is still connected to contact 21. The input of amplifier E is now connected to contact 41, which in turn is connected permanently to the output of amplifier A, and therefore the signal from detector 1 passes through preamplifier A to amplifier E. The noise at the switching of contact 21 has, however, died down and the connection between the detector 1 and the input to preamplifier A is therefore free from noise. As has been mentioned above there will be some noise from switching amplifier E to the contact 41 but this is at the high amplified signal level output of preamplifier A and therefore the signal is well above noise level. In the position shown it will be noted that the input to amplifier B is now just connected to contact 22. There is a burst of noise but the output of preamplifier B is not connected at this time to amplifier E and so the noise is not passed on to the system. Amplifier C is not connected either to contact 35 or contact 23. It is between them. The input of preamplifier D is connected to the last third of contact 36 and is being disconnected. This also generates noise but the output of amplifier D is also not connected at this time to amplifier E and the noise does not go on into the system.

At the next step the input of preamplifier A switches off contact 21 and the input of amplifier E switches to the contact 42. However, the noise of the switching off of preamplifier A is not passed on to the system as it is not connected in this position with amplifier E. The input of preamplifier B in this position is in the center of contact 22 where the initial switching noise has died down and so when its output is connected to amplifier E there will be a noise free connection from detector 2 to the input of preamplifier B. Preamplifier C has just been switched into the first three third of contact 23. There is a burst of noise but as the output of the preamplifier is not connected to amplifier E it also does not pass on to the system.

At the next step a similar situation arises. The input of preamplifier A is not connected to anything. That of preamplifier C is in the middle of the contact 23 and the input of amplifier D is being switched to contact 24. Again the only connection is from detector 3 to amplifier E and this is through a noise free connection to the input of preamplifier C.

In the fourth position amplifier D is in the quiet third of contact 24 and its signal is passed on to amplifier E. At this point the input of preamplifier A is switched to contact 25. As the switching continues the sequence just described is repeated from detectors 5 to 8, then another sequence from detectors 9 to 12 and finally the fourth sequence from detectors 13 to 16. Then a new rotation of the switching commutator starts as described above.

Figure 3:
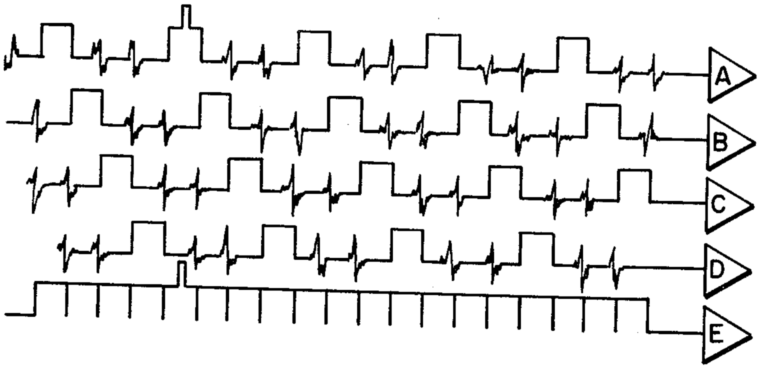
FIG. 3 shows wave forms in the inputs of the amplifiers.

FIG. 3 shows the wave forms at the inputs of the five amplifiers and it illustrates a signal on detector 5. It will be seen that there is so much noise in the switching on and off of the input to each of the three preamplifiers that the signal could easily be drowned out, the noise spikes being of comparable size to the signal information. The signal illustrated is a rather strong one but the situation would be completely hopeless if it were say half its amplitude. In the input to amplifier E the signal level is so high that the switching noise in switching in amplifier E is well below signal level. The wave form therefore only shows negative spikes for the small time between contacts for this amplifier. However, now the signal from detector 5 comes through without any noise and can be read clearly and accurately. None of the noise in any of the preamplifiers is high enough to constitute a spurious signal.

FIGS. 1 to 3 show a mechanical switching. This presents a very simple illustration and so was first described. For slow sampling rates with a moderate number of detectors or other signal sources mechanical switching can be used. However, for many operations where switching rate of 10 kc. and more are needed mechanical switching cannot be employed. For this purpose electronic switching has to be used and this is illustrated in block diagram form in FIG. 4, the elements corresponding to the mechanical contacts having the same numerals.

In the diagram the switching of the inputs of the four preamplifiers is shown as lasting for three times as long as the switching of the input of amplifier E to the outputs of the preamplifiers. The difference in time appears graphically as the size of the switching rectangular blocks. The solid state switches are arranged in banks which is customary and the two banks are referred to respectively as the X and Y banks. This same general design is used in FIG. 1 where the outputs of preamplifiers A, B, C and D are shown as going to four contacts each.

Figure 4:
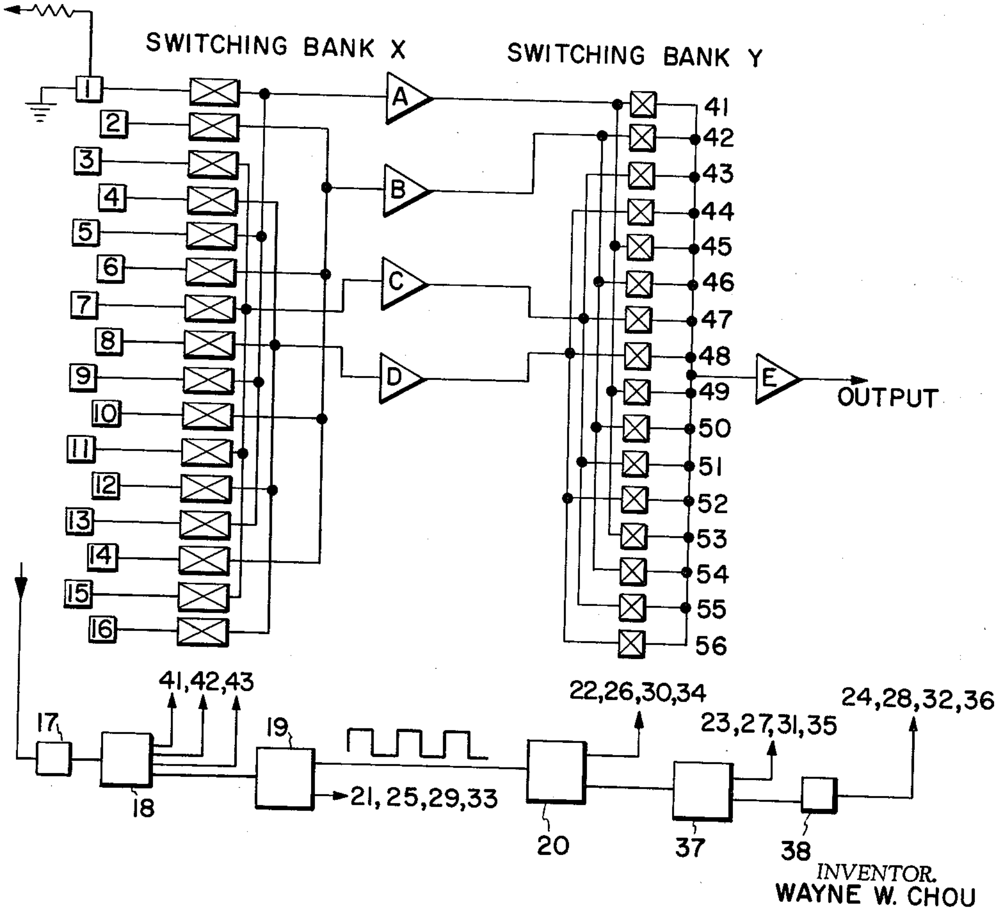
FIG. 4 is a block diagram of a solid state switching modification.

FIG. 4 shows switching commands in the form of pulses which is a common means of actuating solid state switches. Sampling requires a reference pulse generator which is shown at 17 and which may be of any conventional type. When the detectors are used with a scanning mechanism, which is a common type of instrument, the scanning mechanism may produce the switching command pulses. This is done easily by the conventional reference signal generators on scanning means which may be magnetic, interruption of a light beam with a phototransistor or the like. Since these signal generating means are conventional and their particular design forms no part of the present invention they are not further illustrated.

Let us suppose that the sampling rate is a modest 9 kc. The generator 17 would then generate pulses at this rate. These are led into a ring counter 18 which may also be of conventional design and is therefore not shown in detail. The counter counts in series of 16 at the 9 kc. rate and distributes switching pulses in the normal manner. On FIG. 4 three of these pulses going to contacts 41, 42 and 43 of the Y bank are indicated. Each counter pulse also passes through a pulse stretching circuit 19 which is also of conventional design. It produces much broader pulses and of course at a 3 kc. rate as is shown diagrammatically by the square wave in the drawing. The pulses from the stretcher 19 are led directly to contacts 21, 25, 29 and 33 of the X bank as is designated on the figure at the output of the stretcher. The pulses are then passed through a delay line 20 which delays them one sampling frequency interval. They are then sent to contacts 22, 26, 30 and 34 and also to a second delay circuit 37 from which the pulses are sent to contacts 23, 27, 31 and 35. Finally the pulses are sent through a third delay circuit 38 to contacts 24, 28, 32 and 36. The contact numbers are indicated on the drawing. The delay circuits are purely conventional their components being chosen to produce the desired delay.

It will be seen that FIG. 4 produces a switching sequence which is the same as that produced in FIGS. 1 and 2 but the switching rate is much higher thus adapting the present invention to a different field where the mechanical sampling rates are far too slow. The operation is just as effective and the suppression of noise in the switching takes place in the same manner as described in connection with FIGS. 1 to 3. The increased speed is obtained at the cost of a larger number of elements in the switches but solid state switches are cheap and reliable and take up little space so that is a small price to pay for the greatly increased switching speed which is made possible.

Figure 5:
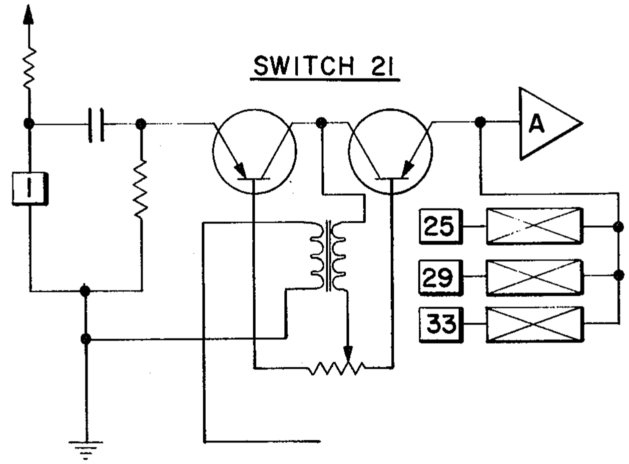
FIG. 5 is a partial schematic of a solid stage switch for preamplifier input.

While the switches may be of any conventional form I have found that there is some advantage in using a two transistor switch of the type shown schematically in FIG. 5. The bias and load resistor corresponds to the detector 1. The operation of the transistor switch is self-evident and by an adjustment of the resistance can be nulled. The schematic shows only one switch corresponding to contact 21 and the other figures and the three other switches connected to the preamplifier A shown diagrammatically as numbers 25, 29 and 33.

Figure 6:
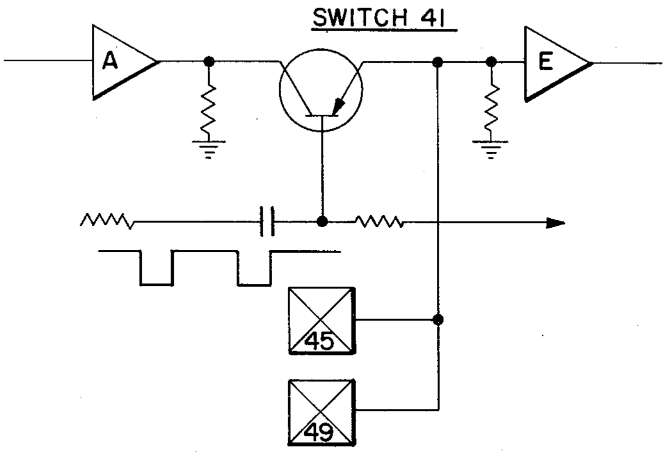
FIG. 6 is a partial schematic of a solid state switch from preamplifier output to the operational amplifier.

FIG. 6 shows a schematic of a suitable transistor switch for the Y bank. This would correspond to switch 41. Two other switches 45 and 49 are shown in block diagram. Of course, the switch 53 would be connected in the same manner. The Y bank switch type shown in FIG. 6 is illustrative only and other known electronic switching means may be substituted therefor.

The time intervals for the X bank switches have been stated to be three times that of the Y bank switches with a blank interval equal to one Y bank switch interval. It is an advantage of the present invention that these exact time intervals are not in any way critical. All that is necessary is that the X bank switches remain open for a time sufficiently longer than a Y bank switch interval so that the initial switching noise will have died down at the time the output of the corresponding preamplifier is connected to the input of the amplifier E and that the contact remains during the whole of the period of connection to the amplifier E and hence to the system. Thus, for example, the duration of the X bank switch intervals could be somewhat less than 3 times a Y bank interval or slightly greater. This is a real practical advantage as it makes precision adjustment of the switches unnecessary. With mechanical switches the advantage is less marked as switching contacts of constant size are provided as a matter of course. However, with electronic switches the leeway which the present invention gives makes for minimum switch cost and maximum reliability. It is, therefore, a definite practical advantage.

In the general discussion in the introductory portions of the present specification reference has been made to preamplifier noise. While the present invention is not in any way limited to any particular preamplifier it is desirable to utilize amplifiers of the lowest possible noise because otherwise the sensitivity of the overall instrument will be limited by the amplifier noise and not by the detector noise. It is advantageous to utilize an extremely low noise preamplifier, for example, the type which has been described and claimed in the copending application of Schwarz and Chou, Serial No. 102,785 filed April 13, 1961. In this transistor amplifier the first input transistor or if necessary the first and second stages are operated at extremely low current as well as low voltage. When silicon transistors which are available today are used such an amplifier operating at around 4$\mu$a current in the first transistor has so low a noise, even at low frequencies that it makes possible instruments which are practically detector noise limited. In other words, theoretically maximum possible sensitivity can be closely approached with this type of amplifier. While the present invention is no sense limited to any particular preamplifier it is, of course, advantageous to use as low noise a preamplifier as is possible because the advantages of the present invention in eliminating switching noise do not, of course, apply to preamplifier noise and a noisy preamplifier can nullify the advantages of the present invention. However, it is an advantage that the particular design of preamplifier has nothing to do with the invention. All that is needed is to choose a preamplifier of low noise characteristics.

The production of the sequential switching pulses can be effected in a number of different types of known electronic equipment. A conventional ring counter has been illustrated in the drawings. This is a circuit which is stable and has higher power capabilities. It represents therefore a desirable type where the number of switches is not excessive. When a very large number of switches are required, for example 100 or 1,000 the newly developed beam tube switches may be used. These are cathode ray tubes in which the deflected electron beam, which is usually spirally deflected, strikes successive electrodes instead of a phosphor in the ordinary cathode ray tube used in oscilloscopes, television receivers and the like. As the electron beam passes over successive electrodes the pulses are produced. The tubes are customarily made with 10 electrodes and two tubes in series can handle 100 switches, three tubes a 1,000 and so on. The present invention is very flexible and any combination of components can be chosen to give the optimum performance for particular conditions.

A single operational amplifier E has been described and for a moderate number of switches and amplifiers this represents a very simple form of the invention. With much larger numbers of elements isolation may be necessary and groups of amplifiers can be made to feed buffer amplifiers and the small number of buffer amplifiers then switches conventionally for the final system output. The advantages of the present invention are thus in no sense limited to a single operational amplifier.

The ring counters and switches have not been shown as they are simple, reliable and well known devices. It is possible, of course, also to effect switching by other types of switches such as, for example magnetic switching devices. However, the counters and beam tube modifications present some advantage as these elements have been highly developed and are readily available in rugged and reliable form.

I claim:

1. Electronic circuits for the sequential sampling of extremely low level electric outputs from a plurality of sources while substantially eliminating switch generated noise at low input level, comprising, (a) a plurality of low level electric outputs, (b) a much smaller number of preamplifiers, (c) at least one operational amplifier, (d) switching means connecting the input of the operational amplifier to the outputs of the preamplifiers, and means for actuating said switching means at a predetermined switching frequency, (e) a second set of switching means connecting the inputs of the preamplifiers to the low level electric outputs, and means for actuating said second set of switching means at a lower frequency than that of the first set, the connections of the preamplifiers to the low level electrical outputs being staggered so that switching occurs before the switching by the first set of switching means of the output of the same preamplifier to the operational amplifier, the staggering being sufficient so that switching noise resulting from the second set of switching means dies down before the output of the same preamplifier is switched to the operational amplifier by the first switching means, whereby switching noise in the second set of switching means does not reach the output of any operational amplifier and does not degrade the signal to noise ratio of the instrument.

2. Electronic circuits according to claim 1 in which the first and second switching means are mechanical commutators, the contacts of the second set of switching means being longer than those of the first set.

3. Electronic circuits according to claim 1 in which both sets of switching means are electronic switches, the first set being actuated at a higher frequency than the second set.

4. Electronic circuits according to claim 3 in which the actuation of the switching means is effected by a pulse generator generating pulses at the frequency of the first switching means, means connecting the output of the pulse generator to the switches of the first switching means sequentially, a pulse stretching circuit, means connecting the input thereto to the output of the pulse generator and means connecting the output thereof sequentially to the second switching means.

5. Circuits according to claim 3 in which the switches are solid state switches.

6. Circuits according to claim 5 in which the solid state switches are transistor switches.

7. Circuits according to claim 4 comprising delay lines receiving stretched pulses from the pulse stretching circuits and introducing delays corresponding to the staggering of the amplifiers.

8. Circuits according to claim 7 in which the switches are solid state switches.

References Cited by the Examiner

UNITED STATES PATENTS

| | | | |
|---|---|---|---|
| 2,967,276 | 1/1961 | Colten et al. | 328—97 |
| 3,089,091 | 5/1963 | Lindenthal | 328—104 |

ROY LAKE, *Primary Examiner.*